(12) United States Patent
Bultan

(10) Patent No.: US 9,276,653 B2
(45) Date of Patent: Mar. 1, 2016

(54) ANTENNA SELECTION AND PILOT COMPRESSION IN MIMO SYSTEMS

(71) Applicant: Lattice Semiconductor Corporation, Portland, OR (US)

(72) Inventor: Aykut Bultan, Santa Clara, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 140 days.

(21) Appl. No.: 13/859,764

(22) Filed: Apr. 10, 2013

(65) Prior Publication Data

US 2013/0265900 A1     Oct. 10, 2013

Related U.S. Application Data

(60) Provisional application No. 61/622,184, filed on Apr. 10, 2012.

(51) Int. Cl.
*H04B 7/04*  (2006.01)
*H04B 7/06*  (2006.01)

(52) U.S. Cl.
CPC ............ *H04B 7/0456* (2013.01); *H04B 7/0417* (2013.01); *H04B 7/0691* (2013.01); *H04B 7/061* (2013.01)

(58) Field of Classification Search
CPC .... H04B 7/0456; H04B 7/0691; H04B 7/061; H04B 7/0417
USPC ......................................................... 370/252
See application file for complete search history.

(56) References Cited

U.S. PATENT DOCUMENTS

| 7,715,846 | B2 * | 5/2010 | Ji et al. ........................... 455/447 |
| 2008/0008276 | A1 * | 1/2008 | Yokoyama .................... 375/347 |
| 2009/0274110 | A1 | 11/2009 | Teo et al. |
| 2010/0246527 | A1 | 9/2010 | Montojo et al. |
| 2011/0244873 | A1 | 10/2011 | Lee et al. |
| 2011/0312353 | A1 * | 12/2011 | Banister et al. ............... 455/500 |
| 2011/0319109 | A1 * | 12/2011 | Kang et al. .................... 455/507 |

(Continued)

OTHER PUBLICATIONS

3rd Generation Partnership Project (Technical Specification Group Radio Access Network; Evolved Universal Terrestrial Radio Access (E-UTRA); Physical Channels and Modulation (Release 8)) v 8.6.0 Document No. 36.211 published Mar. 2009.*

(Continued)

*Primary Examiner* — Andrew Lai
*Assistant Examiner* — Albert Shih
(74) *Attorney, Agent, or Firm* — Fenwick & West LLP

(57) ABSTRACT

A system that facilitates antenna selection and pilot reduction in a multi-antenna system is provided. During operation, in response to an activating event, the system performs a full pilot transmission by transmitting pilot signals through all available transmit antennas at a base station. The system then determines the selected subset of transmit antennas by receiving lists of selected antennas from mobile stations associated with preferred users, wherein a given mobile station selects a list of antennas in response to pilot signals received during the full pilot transmission. The system then combines the received lists to produce the selected subset, wherein the selected subset includes all antennas which appear in the received lists of selected antennas. Next, during normal system operation, the system periodically performs a selected pilot transmission by transmitting pilot signals through a selected subset of the available transmit antennas.

15 Claims, 8 Drawing Sheets

(56) References Cited

U.S. PATENT DOCUMENTS

2013/0053050 A1\* 2/2013 Kang et al. ............... 455/452.1
2013/0142054 A1\* 6/2013 Ahmadi ..................... 370/252

OTHER PUBLICATIONS

Ghrayeb, Ali, "A Survey on Antenna Selection for MIMO communication systems", ICTTA 2006, vol. 2, pp. 2104-2109. 6 pages.

Loyka, Sergey, "MIMO Channel Capacity: Electromagnetic Wave Perspective" 27th General Assembly of the International Union of Radio Science, Maastricht, The Netherlands, Aug. 17-24, 2002. 4 pages.

Mehta, N. B. et al., "Antenna selection in LTE: from motivation to specification," IEEE Communications Magazine, vol. 50, No. 10, pp. 144-150, October . 7 pages.

\* cited by examiner

ANTENNA SELECTION AND PILOT COMPRESSION IN MIMO SYSTEMS

BACKGROUND

Field of the Invention

The disclosed embodiments generally relate to techniques for efficiently performing pilot compression in wireless communication systems. More specifically, the disclosed embodiments relate to a pilot compression technique which reduces channel-sounding overhead for MIMO systems by sending pilot signals through a selected subset of available transmit antennas which are associated with preferred users.

DESCRIPTION OF THE RELATED ART

Channel sounding is a commonly used technique for improving the performance of wireless communication systems, and can for example be used to allow a base station and an associated mobile unit to compensate for the impact of a wireless channel response. During the channel-sounding process, a communication channel is characterized by measuring the channel's response to various test signals (which are referred to as "pilots"). This measured response can be used to perform equalization operations, and also to decide how to transmit data in parallel through multiple signal paths in multiple-input, multiple-output (MIMO) wireless systems.

The wireless industry has been pushing for higher order MIMO systems for more than a decade. A few years back, MIMO systems beyond 4×2 were thought impractical. Now, LTE-A standards are considering 8×8 MIMO systems. This trend is bound to continue. The main reason for not transitioning to a high number of MIMO antennas is implementation difficulties. However, micro-antenna research is a very active field and economical micro-strip antennas can presently be implemented in a very small space. Hence, larger numbers of antennas will be incorporated into both Mobile Stations (MSs) and associated Base Stations (BSs) in the near future.

However, a major problem remains. For example, in an OFDM system, for each transmit antenna that is added to the transmitter, there typically needs to be a dedicated pilot signal for the antenna that is distributed over time-frequency resource elements. For example, in a CDMA system, for each transmit antenna that is added to the transmitter, there typically needs to be a dedicated pilot signal that is transmitted almost all the time (with some exceptions). This is required to estimate the MIMO channel response through channel-sounding operations. Note that for OFDM systems there is generally no data transmission in the pilot signal locations in order to avoid interference. Consequently, as the number of transmit antennas increases, the number of dedicated pilots increases which reduces the number of available resource elements for data transmission. In the case of a CDMA system, increasing the number of pilots increases the interference caused by the pilots on the data. This makes it hard to achieve the potential throughput increase that the MIMO systems would offer with no pilots or fewer pilots. This is one of the main problems limiting an increase in the number of antennas in MIMO communication systems.

BRIEF DESCRIPTION OF THE FIGURES DRAWINGS

Figure 4:
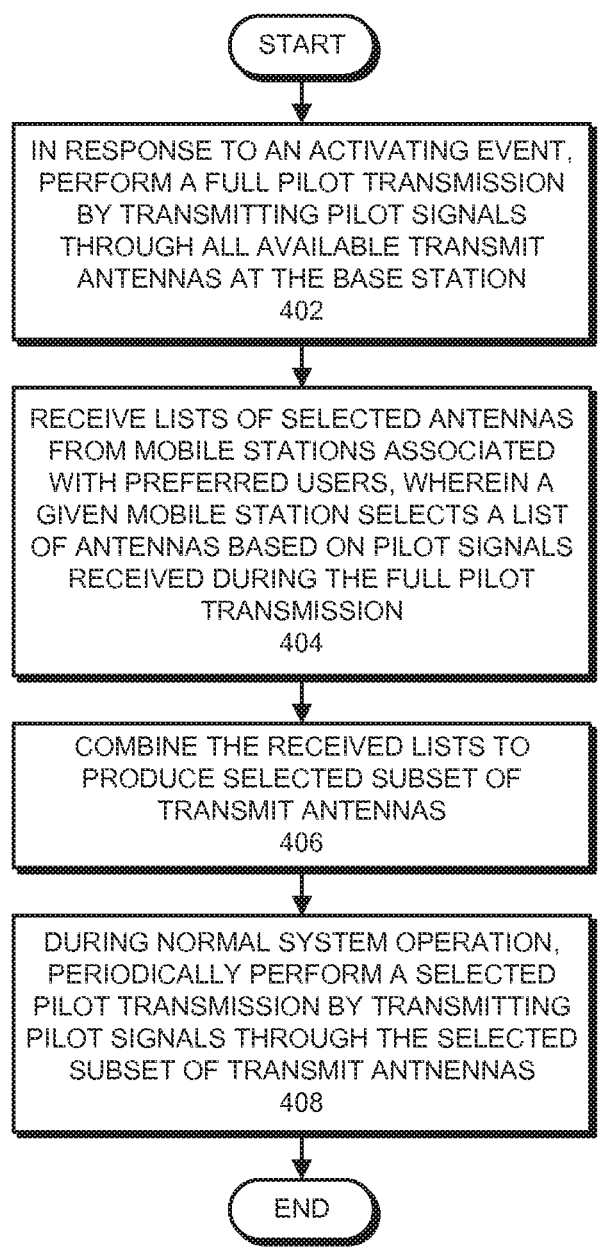

FIG. 4 presents a flow chart illustrating operations performed by a base station during a channel-sounding operation in accordance with the disclosed embodiments.

Figure 5:
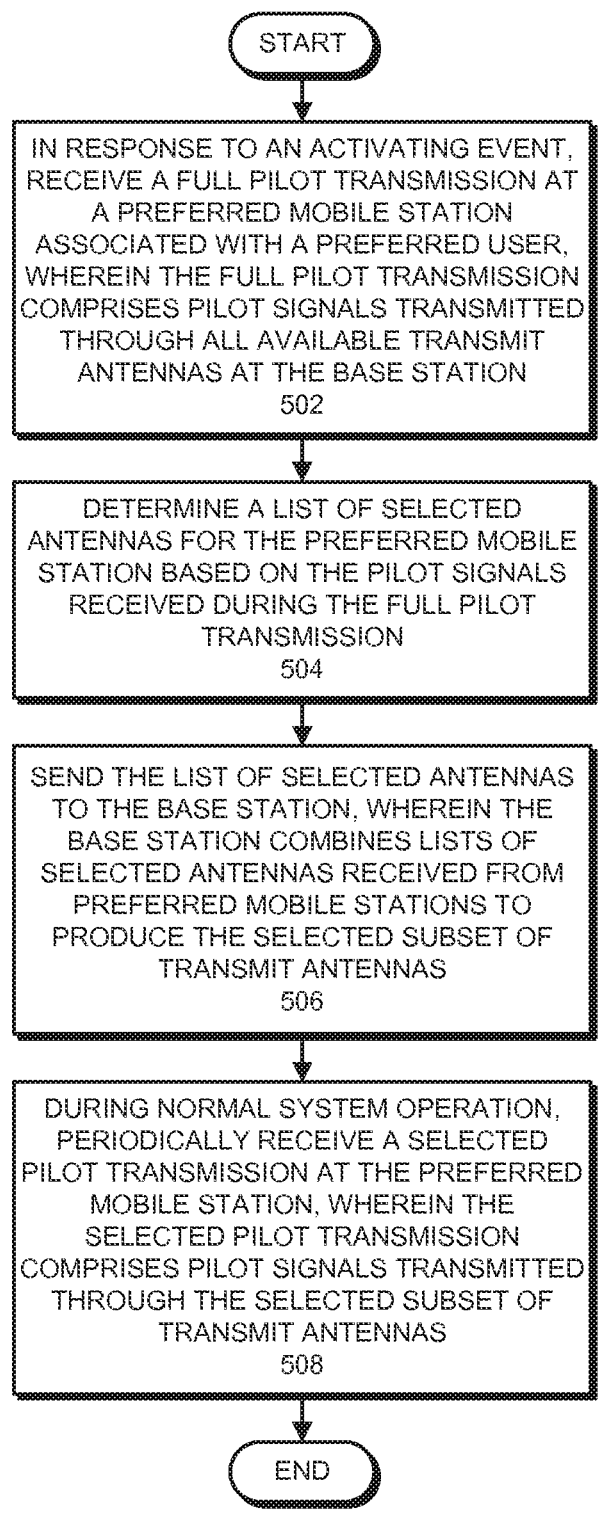

FIG. 5 presents a flow chart illustrating operations performed by a mobile station during a channel-sounding operation in accordance with the disclosed embodiments.

Figure 6:
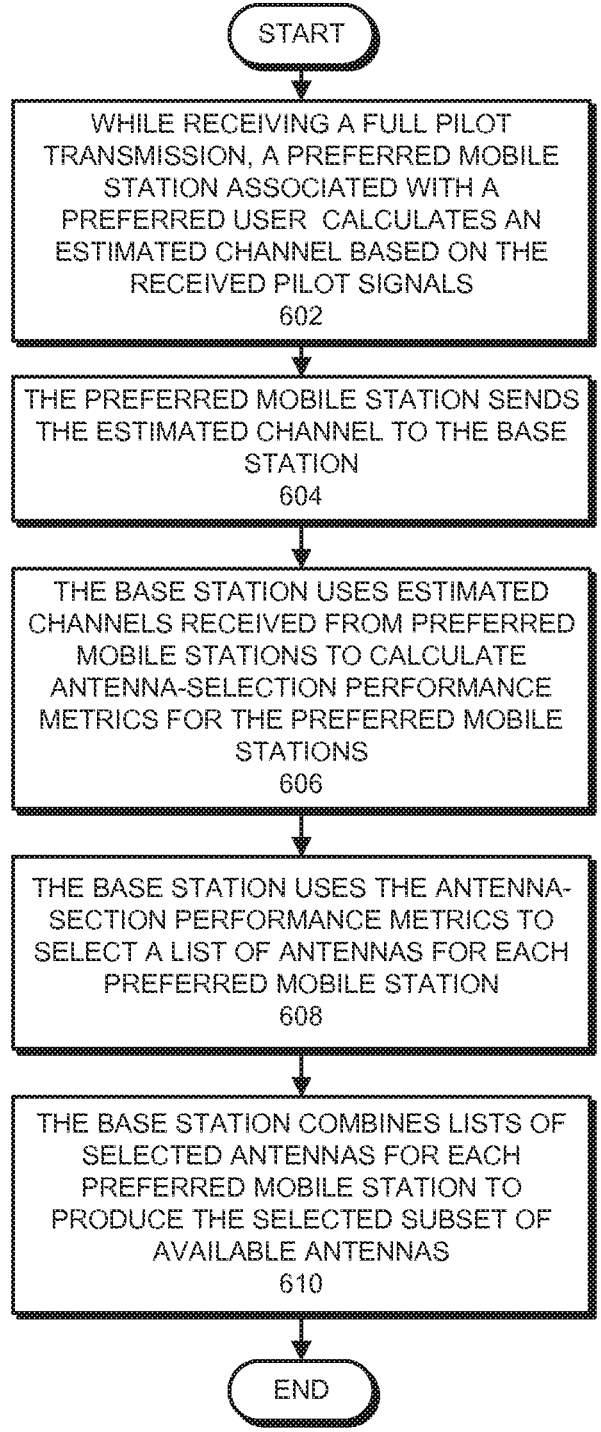

FIG. 6 presents a flow chart illustrating operations performed by a mobile station and a base station during a channel-sounding operation in accordance with another embodiment.

Figure 7:
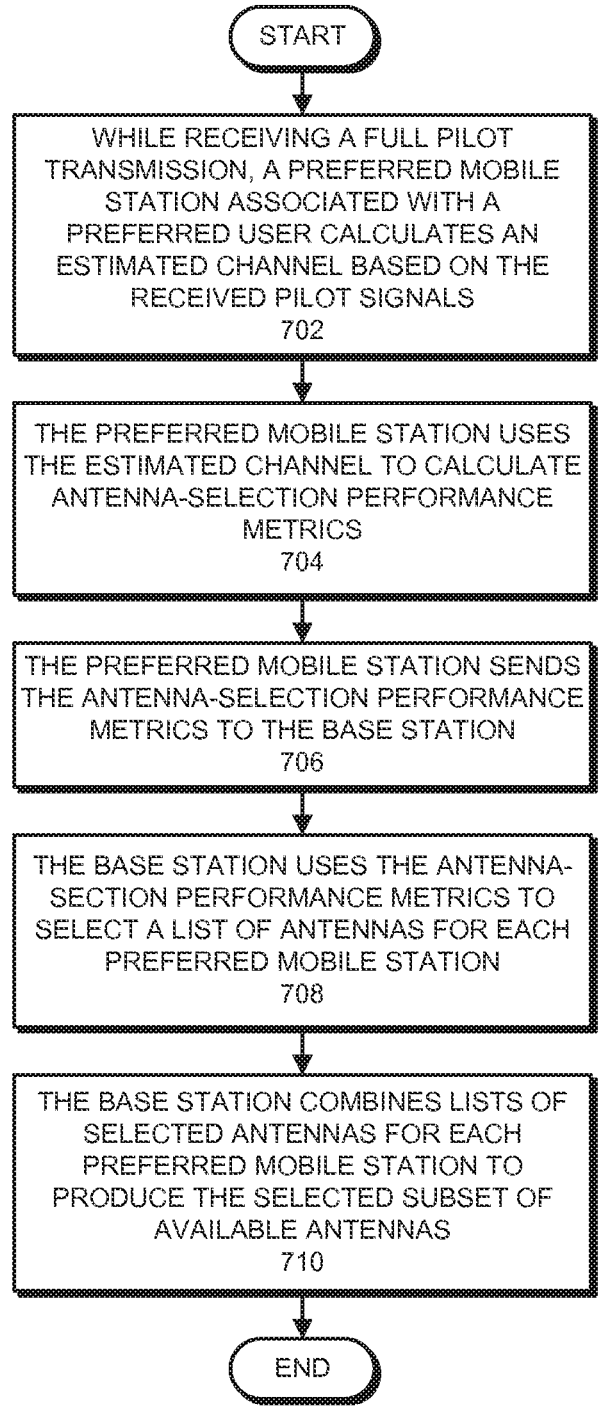

FIG. 7 presents a flow chart illustrating operations performed by a mobile station and a base station during a channel-sounding operation in accordance with yet another embodiment.

Figure 8:
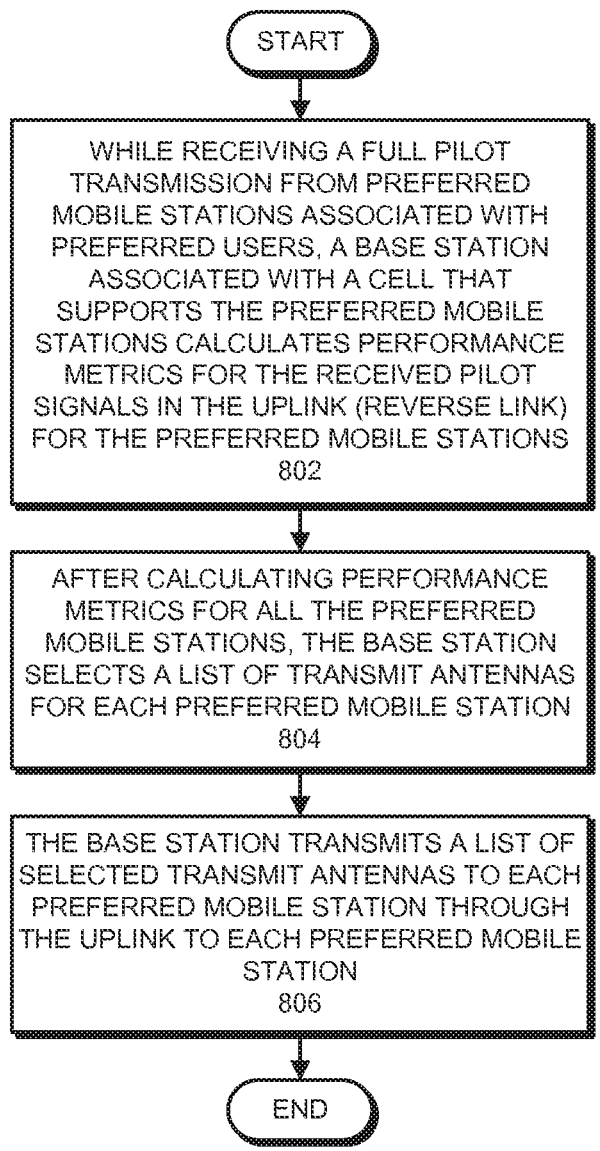

FIG. 8 presents a flow chart illustrating operations performed by a base station during a channel-sounding operation in the reverse direction from mobile stations to the base station in accordance with the disclosed embodiments.

DETAILED DESCRIPTION OF THE INVENTION

Overview

The disclosed embodiments relate to a new technique for antenna selection and pilot compression which operates in a closed-loop system that includes both a mobile station (MS) and a base station (BS). This technique operates by selecting a smaller set of transmit antennas from a larger set of available transmit antennas based on various performance metrics. Next, only pilots which are associated with these selected antennas are transmitted on regular frames. These selected pilot signals comprise a smaller subset of the complete set of pilots that is associated with all of the available transmit antennas. The complete set of pilots is transmitted much less frequently upon certain activation events, e.g., during special frames (discussed in greater detail below). By using this technique, the overhead involved in transmitting pilots through transmit antennas is significantly reduced.

This solution can be very useful in many situations including:
1. The number of performance-enhancing transmit antennas is smaller than the number of total transmit antennas available at the BS.
2. There are a smaller number of preferred users compared to the large number of users in a typical macro cell. Exemplary use cases occur in home or office environments with a few preferred users.
3. Low mobility speed for mobile stations.

Before we describe further details of the invention, we first describe an example of a system for which the invention provides benefits. An exemplary system has a large number of transmit antennas N, where N>>2, e.g. N=16. The number of transmit antennas used at any given time by any user i is given by $L_i$ and the total number of antennas used by all the preferred users is given by L, where $L_i \le L \le N$. For example, $L_i$ can be 2, 4, 8, etc. However, at any given time and location, not all the transmit antennas provide MIMO benefits, such as spatial multiplexing gain or diversity gain, depending on MIMO channel conditions at that particular location. Because of this, MIMO benefits may saturate quickly as the number of transmit antennas increases more than the available receive antennas at the MS or more than the MIMO channel capacity.

However, at another time and location or for a different user, another subset of transmit antennas might be more useful than others. Therefore, we may have many available transmit antennas, but may end up using a smaller set of transmit antennas. In order to operate efficiently, this type of system will require some type of antenna-selection mechanism.

Note that many use cases do not involve high speeds or large numbers of users. For example, in a typical home or office environment there are few users requiring wireless connections, and these users are relatively low speed and can easily be classified as either static or pedestrian (with typical speeds of around 3-5 km/hr). These environments can effectively use a connection, a femto cell, or a combination of the two. Note that femto cells are a relatively new concept for LTE-A wireless standards and beyond. They have unique requirements such as lower power levels and a need for self-organizing network (SON) algorithms that macro cells do not have. However, they also present unique opportunities because they typically have a small number of preferred users with low mobility speeds. Because such femto cells are relatively new, their properties have not yet been fully explored. Moreover, MIMO systems typically achieve their full potential when there are many independent reflectors around and the transmit antennas are not too far away. As a consequence, the home and office environments are very good use cases for higher-order MIMO systems.

Figure 3:
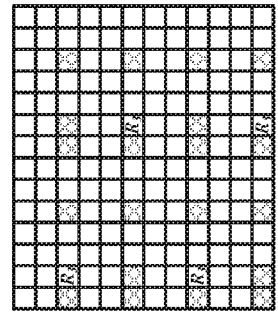
FIG. 3 illustrates how pilot signals are sent through multiple antennas in accordance with the disclosed embodiments.
Figure 3:
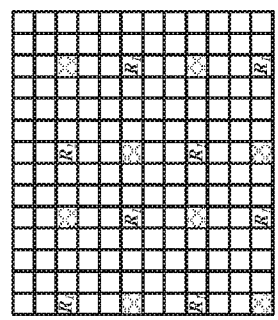
Figure 3:
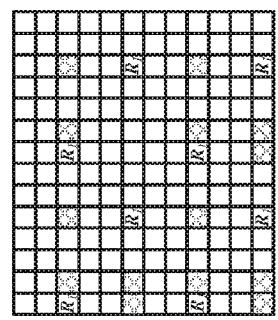
Figure 3:
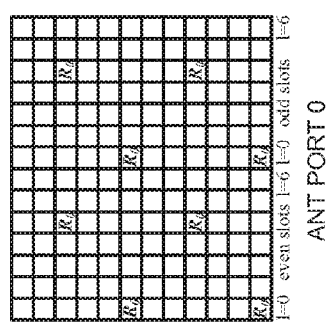
Figure 3:
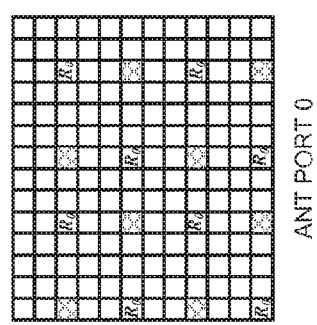
Figure 3:
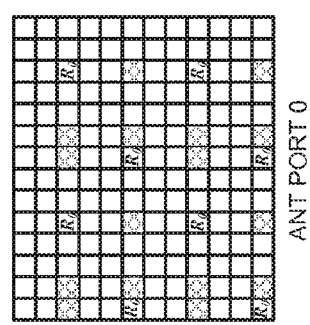

The new technique generally operates as follows. First, the BS sends pilots for all the available transmit antennas (used or not). This is called full pilot transmission (FPT). Note that a full pilot transmission can be applied to all OFDM-MIMO systems, such as future Wi-Fi and WiMax standards, as well as present and evolving CDMA systems. The full pilot transmission happens upon the triggering of one or more activation events. Once such activation event occurs, the full pilot transmission takes place upon the occurrence of special frames. Note that the full pilot transmission happens much less frequently than a selected pilot transmission which involves sending only the selected pilots. For low Doppler speeds of 3-5 km/hr, it is possible to make a full pilot transmission across multiple frames. Hence, full pilot transmissions can use special frames in multiples of 10 ms periods depending on the assumed maximum Doppler frequency. This increases the efficiency of the scheme while reducing the overhead. For example, in an LTE system, the BS can send pilot signals every sub-frame, which has 1 ms duration. Note that every transmit antenna is associated with a dedicated pilot signal which is spread over time-frequency resources. For example, FIG. 3 illustrates pilot resource elements (REs) for 1, 2 and 4 transmit antennas.

Next, at the MS, the receiver performs antenna selection from all of the available transmit antennas. This selection process can be accomplished by using various metrics, such as received SNR or other capacity metrics. There are a number of well-known techniques that can be used to perform reliable antenna selection at the MS. For example, the capacity of a MIMO channel can be given by the following formula, $$C = \log_2 \det\left(I_M + \frac{\rho}{N} H H^H\right)$$

where H is the N×M MIMO channel matrix with N transmit antennas and M receive antennas, and ρ is the average SNR at the receive antenna. Without loss of generality, when the receiver selects the best $L_i$ antennas that maximize channel capacity, the resulting channel capacity can be upper bounded as $$C_{select} = \sum_{i=1}^{L_i} \log_2\left(1 + \frac{\rho}{N} \gamma_i\right)$$

where $\gamma_i$ represents the squared norm of the ith row of H after ordering from smallest to largest. It has been shown that most of the capacity of the MIMO system is retained with antenna selection in typical channel conditions.

Another technique for antenna selection uses received SNR in the MS. Both capacity-based methods and received. SNR-based methods can be used for antenna selection. However, these techniques are just exemplary and the antenna-selection process for purposes of the disclosure is not meant to be limited to any particular antenna-selection technique.

Once the MS selects the $L_i$ antennas, the selected antenna index is fed back to the BS through an uplink control channel. The BS receives the selected antenna indices from all of the preferred users and then determines a set of L antennas that covers all of the selected antennas from all of the preferred users. Because there might be common selected antennas among different preferred BSs, in general $$L \leq \sum_i L_i$$

For purposes of this disclosure, the important result is the ratio of selected antennas over available transmit antennas. As the ratio of selected antennas (subset) to total number of transmit antennas (the complete set) gets lower, the performance of the multi-antenna system increases.

After the antenna-selection process is complete, the BS transmits pilot signals for only the selected transmit antennas during a regular pilot transmission, i.e. non-special or regular frames. Note that special frames are not restricted to UMTS defined frames, i.e., multiples of 10 ms. Rather, the term special frames is a generic term used to indicate the less frequent periods of FPT. Accordingly, e.g., FPT (or special frames) might take place in the first time slot of every third or seventh subframe in a UNITS frame. However, it still sends full pilots upon certain activation events to support mobility and new preferred users joining to the cell. By doing this, many resource elements are freed for data transmission while achieving the full potential of higher order MIMO systems.

Once the number L is determined through the procedure described above, the pilot signals for these antennas are placed in the pre-defined time-frequency resource element locations for the first L transmit antennas. Note that the resource element indices of the transmit antennas can be pre-defined to avoid an extra overhead of transmitting time-frequency indices for these locations. For this purpose, it does not matter which specific transmit antennas are selected. What is important is the total number of transmit antennas selected by the preferred users. This total number will determine the total pilot overhead for the MIMO system.

Non-preferred users are not given the chance to select the transmit antennas for pilot transmission. Instead, they perceive the system to be like a regular macro BS with a number of transmit antennas equal to the selected number of transit antennas of a macro BS. A different policy can be used for non-preferred users wherein the BS acts like a regular macro BS for the purposes of antenna-selection. This differentiation helps to limit the number of transmit antennas being used, and therefore limits the number of associated pilots. This approach can effectively maximize both throughput and range for preferred users.

Non-preferred users can select a subset of the selected transmit antennas or they can simply feedback performance metrics fir a number of MIMO techniques at the transmitter, such as spatial multiplexing, beam forming, STBC, etc. If the non-preferred users are allowed to do antenna selection, then it is different than the selection process described above. In this case, there is still data transmission on the antennas that are selected by non-preferred users but not through antennas selected by the preferred users.

In summary, what is proposed is a three-step process for preferred users.
1. The system first transmits full pilot signals that belong to all the available transmit antennas (e.g., for low mobility use cases).
2. Next, all active preferred MSs run their receiver-based techniques for transmit antenna selection, and then select a number of transmit antennas to be used for data transmission. Note that different selection techniques can be used, such as MIMO-capacity-maximizing or receive-SNR-maximizing approaches.
3. Then, the BS uses only the L transmit antennas selected by the preferred users for data transmission. Moreover, only the pilots that belong to these antennas are transmitted in regular pilot locations. Full pilot transmissions are only transmitted when certain activation events happen instead of on every sub-frame like regular pilots.

We now describe a number of details of the above-described system.

Multi-Antenna System

Figure 1:
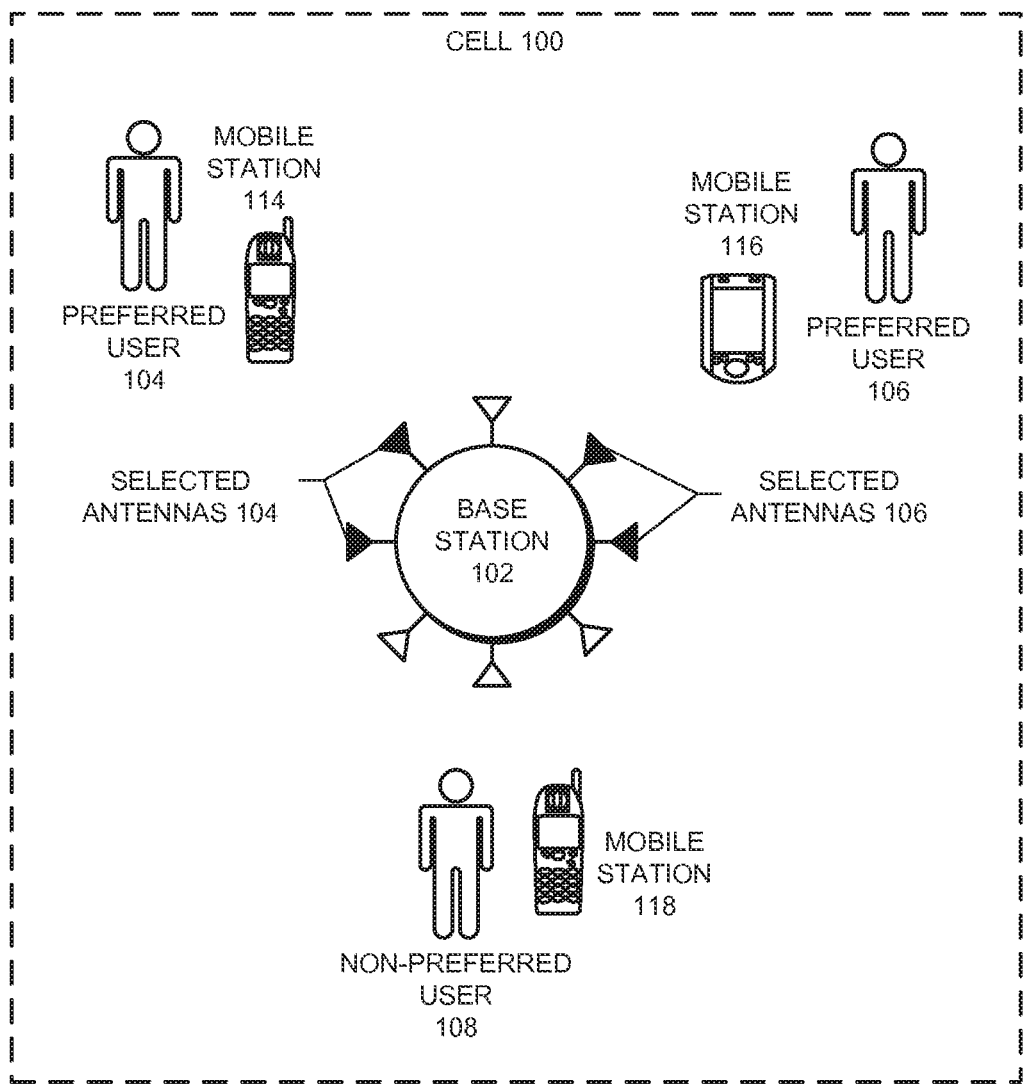
FIG. 1 illustrates a multi-antenna system in accordance with the disclosed embodiments.

FIG. 1 illustrates a multi-antenna system in accordance with the disclosed embodiments. This system includes a base station 102 that communicates with various mobile stations within a wireless cell 100. More specifically, base station 102 communicates with mobile station 114 associated with preferred user 104 and mobile station 116 associated with preferred user 106. Base station 102 additionally communicates with a mobile station 118 associated with a non-preferred user 108. Note that mobile stations 114, 116 and 118 can generally include any mobile device which can communicate with a base station, such as a cellular phone, a smartphone, a laptop computer, a tablet computer or a desktop computer system with a wireless interface. Moreover, preferred users and non-preferred users can be differentiated based on any possible criteria. For example, preferred users may be employees of a company which access the services of a base station 102, whereas non-preferred users can be other non-employee users of base station 102.

Note that base station 102 includes multiple antennas. Moreover, preferred user 104 and preferred user 106 may select different antennas or some of the same antennas of base station 102. (FIG. 1 shows different antennas being selected by the preferred uses 104 and 106.) Base station 102 periodically performs normal channel-sounding operations by performing a "selected pilot transmission," which involves sending pilot signals through these selected transmit antennas. In contrast, during special circumstances activation events), base station 102 performs a "full pilot transmission," which involves sending pilot signals through all available transmit antennas.

Internal Circuitry

Figure 2:
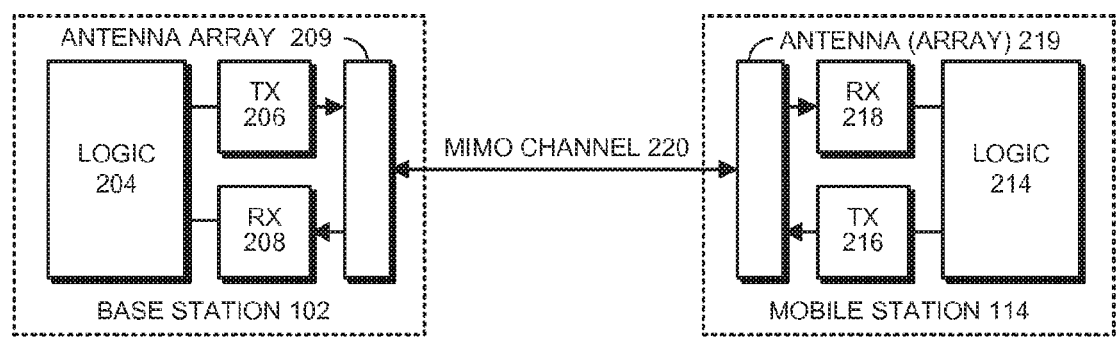
FIG. 2 illustrates internal circuitry within a base station and a mobile station in accordance with the disclosed embodiments.

FIG. 2 illustrates some of the internal circuitry within base station 102 and mobile station 114 which communicate through a wireless communication channel 220 in accordance with the disclosed embodiments. Base station 102 includes logic 204, a wireless transmitter (TX) 206, a wireless receiver (RX) 208 and an antenna array 209 comprised of multiple antenna elements. Note that logic 204 performs various channel-sounding operations and associated operations which are described in more detail below. Mobile station 114 similarly includes logic 214, a wireless transmitter 216, a wireless receiver 218 and an antenna 219 (which may be an antenna array).

Assume that base station 102 acts as a transmitter and mobile station 114 acts as a receiver during a channel-sounding process. In this case, the pilot signals which are transmitted by base station 102 and received by mobile station 114 can be processed at logic 214 in mobile station 114. Alternatively, performance metrics such as the estimated channel matrix, the calculated performance metrics (e.g., channel capacity, effective receive SNR) or the indices of selected antennas, can be returned to base station 102 to be processed by logic 204 within base station 102.

Pilot Signals

FIG. 3 illustrates how pilot signals are sent through multiple antennas in accordance with the disclosed embodiments. More specifically, FIG. 3 illustrates exemplary resource-element layouts for 1, 2 and 4 transmit antennas. In each of the grids illustrated in FIG. 3, the vertical dimension is associated with 12 different frequencies and the horizontal dimension is associated with 14 different time slots, wherein from left to right the even-numbered slots occupy the first 7 entries (1=0 . . . 1=6) and the odd-numbered slots occupy the next seven entries 1=0 . . . 1=6). Moreover, the reference symbols $R_0$, $R_1$, $R_2$ and $R_3$ appear in resource elements are associated with pilots and the blank resource elements are associated with data. Also, cross-hatching marks resource elements which are not used for transmission of pilots or data at the particular antenna port. This allows a pilot symbol to be transmitted from another antenna port without interference.

Note that as the number of antenna ports used to send pilot signals increases from 1 to 2 to 4, the overhead involved in transmitting pilots greatly increases. This makes it impractical to send pilots through a large number of antenna ports.

Channel-Sounding Operations

FIG. 4 presents a flow chart illustrating operations performed by a base station during a channel-sounding operation in accordance with the disclosed embodiments. First, in response to an activating event, the system performs a full pilot transmission by transmitting pilot signals through all available transmit antennas at the base station (step 402). Note that the activating event can involve: (1) a new mobile station for a preferred user joining a cell associated with the base station; (2) a throughput of a mobile station for a preferred user dropping below a predefined threshold; or (3) a quality of Service (QoS) for a preferred user dropping below a predefined level or (4) an occurrence of a special frame.

Next, the system determines the selected subset of transmit antennas. This involves:
1. Estimating the MIMO channel for FPT using a reliable channel estimation technique, such as least squares (also known as zero-forcing) or minimum mean square error methods, or alternatively estimating the received SNR per transmit antenna;
2. Calculating the antenna selection performance metrics such as shown in the equations above; and
3. Selecting the transmit antennas and pilots that correspond to those transmit antennas based on the performance metrics.

Note that step 1 above is performed in the receiver and steps 2 and 3 can be performed either in the transmitter or receiver. For each of these choices, the receiver sends different feedback information to the transmitter. For example, if only step 1 is done in the receiver, the receiver sends the estimated channel (for example, Channel State Information (CSI) and some measured SNR estimates) to the transmitter. However, if all of the above steps are performed at the receiver, the receiver transmits the indices of the selected transmit antennas to the transmitter through the reverse link.

Then, the BS combines the received lists to produce the selected subset of transmit antennas (step 406), wherein the selected subset includes all antennas which appear in the received lists of selected antennas. Finally, during normal system operation, the system periodically performs a selected pilot transmission by transmitting pilot signals through a selected subset of the available transmit antennas (step 408).

FIG. 5 presents a flow chart illustrating corresponding operations performed by a mobile station during a channel-sounding operation in accordance with the disclosed embodiments. First, in response to an activating event, the system receives a full pilot transmission from the base station at a preferred mobile station associated with a preferred user (step 502). Next, the system determines a list of selected transmit antennas for the preferred mobile station based on the pilot signals received during the full pilot transmission (step 504). The system then sends the list of selected antennas to the base station. This enables the base station to combine lists of selected antennas from preferred mobile stations to produce the selected subset of transmit antennas (step 506). Finally, during normal system operation, the system periodically receives a selected pilot transmission which comprises pilot signals transmitted through the selected subset of transmit antennas (step 508).

In an alternative embodiment, if the mobile station is a preferred mobile station associated with a preferred user, the preferred mobile station returns performance metrics for the pilot signals to the base station. This enables the base station to select the antennas for each preferred mobile station. More specifically, referring to the flow chart in FIG. 6, while receiving a full pilot transmission, a preferred mobile station associated with a preferred user calculates an estimated channel based on the received pilot signals (step 602). As mentioned previously, this can involve calculating an estimated channel matrix or other values, such as channel capacity or effective receive SNR. Next, the preferred mobile station sends the estimated channel to the base station (step 604). The base station subsequently uses estimated channels received from preferred mobile stations to calculate antenna-selection performance metrics for the preferred mobile stations (step 606). Next, the base station uses the antenna-selection performance metrics for preferred mobile stations to select a list of antennas for each preferred mobile station (step 606). The base station then combines the lists of selected antennas for each preferred mobile station to produce the selected subset of available transmit antennas (step 608).

Referring to the flow chart in FIG. 7, in another embodiment, while receiving a full pilot transmission, the mobile station calculates an estimated channel based on the received pilot signals (step 702). Next, the preferred mobile station uses the estimated channel to calculate antenna-selection performance metrics (step 704). The preferred mobile station then sends the antenna-selection performance metrics to the base station (step 706). Next, the base uses antenna-selection performance metrics for preferred mobile stations to select a list of antennas for each preferred mobile station (step 708). The base station then combines the lists of selected antennas for each preferred mobile station to produce the selected subset of available transmit antennas (step 608).

Channel Sounding from Mobile Station to Base Station

FIG. 8 presents a flow chart illustrating operations performed by a base station during a channel-sounding operation in the reverse direction from mobile stations to the base station in accordance with the disclosed embodiments. First, while receiving a full pilot transmission from preferred mobile stations associated with preferred users, the base station (which is associated with a cell that supports the preferred mobile stations calculates performance metrics for the received pilot signals in the uplink (reverse link) for the preferred mobile stations (step 802), (As mentioned previously, calculating the performance metrics can involve first calculating an estimated channel from the received pilot signals and then using the estimated channel to calculate the performance metrics.) After calculating the performance metrics for all the preferred mobile stations, the base station selects a list of transmit antennas for each preferred mobile station (step 804). The base station then transmits a list of selected transmit antennas to each preferred mobile station in the uplink for each preferred mobile station (step 806).

The preceding description was presented to enable any person skilled in the art to make and use the disclosed embodiments, and is provided in the context of a particular application and its requirements.

Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and apparatus described can be included in but are not limited to, application-specific integrated circuit (ASIC) chips, field-programmable gate arrays (FPGAs), and other programmable-logic devices.

What is claimed is:

1. A method for pilot compression at a base station in a multi-antenna system, comprising:
    in response to an activating event, transmitting a plurality of pilot signals through a plurality of transmit antennas at the base station, wherein each of the plurality of transmit antennas transmits a corresponding one of the plurality of pilot signals;
    receiving a set of feedback signals from each of a set of mobile stations, wherein for a given mobile station, each of the feedback signals indicates qualities of each channel over which the plurality of pilot signals are received by the given mobile station from the plurality of transmit antennas;
    selecting for each mobile station a subset of transmit antennas based on the qualities of the each channel indicated in the set of feedback signals;

identifying a superset of transmit antennas, the superset of transmit antennas including all transmit antennas of the subsets of transmit antennas; and during normal system operation, periodically performing a selected pilot transmission including transmitting pilot signals through the superset of transmit antennas.

2. The method of claim 1, wherein the activating event comprises one or more of the following:

a first mobile station for a first preferred user joins a cell associated with the base station;

a throughput of a second mobile station for a second preferred user drops below a predefined threshold;

a quality of Service (QoS) for a third preferred user drops below a predefined level; and an occurrence of an infrequent periodic event.

3. The method of claim 1, wherein the selecting the subset of transmit antennas comprises receiving a list of selected antennas from the each of the set of mobile stations; and wherein the identifying the superset of transmit antennas comprises combining all of the received lists.

4. The method of claim 3, wherein, the quality metric maximizes at least multiple-input-multiple-output (MIMO) channel capacity or a received signal-to-noise-ratio (SNR).

5. The method of claim 1, wherein the selecting the subset of transmit antennas comprises receiving the quality metrics from the set of mobile stations; and wherein the identifying the superset of transmit antennas comprises combining all subsets of transmit antennas.

6. The method of claim 1, wherein the set of feedback signals comprises estimated channels;

wherein the selecting the subset of the transmit antennas comprises calculating the quality metrics; and wherein the identifying the superset of transmit antennas comprises combining all subsets of transmit antennas.

7. The method of claim 1, wherein the multi-antenna system encodes data using orthogonal-frequency-division-multiplexing (OFDM).

8. A system that facilitates pilot compression in a multi-antenna system, comprising:

a base station including multiple transmit antennas; and a channel-sounding mechanism within the base station;

wherein in response to an activating event, the channel-sounding mechanism is configured to:

transmit a plurality of pilot signals through a plurality of transmit antennas at the base station, wherein each of the plurality of transmit antennas transmits a corresponding one of the plurality of pilot signals;

receive a set of feedback signals from each of a set of mobile stations, wherein for a given mobile station, each of the feedback signals indicates qualities of each channel over which the plurality of pilot signals are received by the given mobile station from the plurality of transmit antennas;

select for each mobile station a subset of transmit antennas based on the qualities of the each channel indicated in the set of feedback signals; identify a superset of transmit antennas, the superset of transmit antennas including all transmit antennas of the subsets of transmit antennas; and during normal system operation, periodically perform a selected pilot transmission by transmitting pilot signals through the superset of transmit antennas.

9. The system of claim 8, wherein the activating event comprises one or more of the following:

a first mobile station for a first preferred user joins a cell associated with the base station;

a throughput of a second mobile station for a second preferred user drops below a predefined threshold;

a quality of Service (QoS) for a third preferred user drops below a predefined level; and an occurrence of an infrequent periodic event.

10. The system of claim 8, wherein the channel-sounding mechanism is configured to select the subset of transmit antennas comprises receiving a list of selected antennas from the each of the set of mobile stations; and identify the superset of transmit antennas comprises combining all of the received lists.

11. The system of claim 10, wherein, the quality metric maximizes at least multiple-input-multiple-output (MIMO) channel capacity or a received signal-to-noise-ratio (SNR).

12. The system of claim 10, wherein the channel-sounding mechanism is configured to:

select the subset of transmit antennas comprises receiving the quality metrics from the set of mobile stations; and identify the superset of transmit antennas comprises combining all subsets of transmit antennas.

13. The system of claim 10, wherein the set of feedback signals comprises estimated channels and wherein the channel-sounding mechanism is configured to:

calculate the quality metrics;

select a list of antennas for each preferred mobile station based on the calculated performance metrics; and identify the superset of transmit antennas comprises combining all subsets of transmit.

14. The system of claim 8, wherein the system is a multiple-input-multiple-output (MIMO) communication system.

15. The system of claim 8, wherein the system encodes data using orthogonal-frequency-division-multiplexing (OFDM).

* * * * *